(12) United States Patent
Balls

(10) Patent No.: US 11,695,698 B2
(45) Date of Patent: Jul. 4, 2023

(54) HARDWARE AND SOFTWARE ROUTER

(71) Applicant: MICROSOFT TECHNOLOGY LICENSING, LLC, Redmond, WA (US)

(72) Inventor: Steven Victor Balls, Enfield (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/344,703

(22) Filed: Jun. 10, 2021

(65) Prior Publication Data

US 2022/0345397 A1 Oct. 27, 2022

(51) Int. Cl.
*H04L 45/745* (2022.01)
*H04L 45/28* (2022.01)
(Continued)

(52) U.S. Cl.
CPC ....... *H04L 45/74591* (2022.05); *G06N 20/00* (2019.01); *H04L 41/0896* (2013.01);
(Continued)

(58) Field of Classification Search
CPC . H04L 45/023; H04L 45/54; H04L 45/74591; H04L 45/021; H04L 45/00; H04L 63/10; H04L 63/20; H04L 63/1425; H04L 63/0263; H04L 45/70; H04L 41/145; H04L 43/028; H04L 43/026; H04L 45/60; H04L 45/30; H04L 69/22; H04L 47/33;
(Continued)

(56) References Cited

U.S. PATENT DOCUMENTS 7,461,154 B2 12/2008 Figaro et al.
8,059,658 B1 * 11/2011 Rovner ............ H04L 45/74591
370/395.31
(Continued)

FOREIGN PATENT DOCUMENTS

WO 2020134415 A1 7/2020

OTHER PUBLICATIONS

"BGP Statistics from Route-Views Data", Retrieved from: https://bgp.potaroo.net/bgprpts/rva-index.html, Mar. 3, 2021, 22 Pages.
(Continued)

*Primary Examiner* — Kyung H Shin
(74) *Attorney, Agent, or Firm* — Han Gim; Newport IP, LLC (57) ABSTRACT

A networking router process, by a hardware data plane, a first incoming packet by matching the packet with a routing table of the hardware data plane. A software data plane processes a second incoming packet by matching the packet with a routing table of the software data plane. In response to the processing of the first incoming packet by the hardware data plane failing, subsequently processing, by the software data plane, the first incoming packet by matching the packet with the routing table of the software data plane. The method comprises delivering, from the software and hardware data plane, network traffic flow information to a flow analyzer. The flow analyzer analyzes the network traffic flow information and updates at least one of the routing tables based at least on the analyzed network traffic flow information.

16 Claims, 5 Drawing Sheets (51) Int. Cl.
*G06N 20/00* (2019.01)
*H04L 45/00* (2022.01)
*H04L 45/02* (2022.01)
*H04L 41/0896* (2022.01)
*H04L 47/33* (2022.01)
*H04L 43/028* (2022.01)

(52) U.S. Cl.
CPC .............. *H04L 45/02* (2013.01); *H04L 45/28* (2013.01); *H04L 45/38* (2013.01); *H04L 45/745* (2013.01); *H04L 43/028* (2013.01); *H04L 47/33* (2013.01)

(58) Field of Classification Search
CPC .............. H04L 47/2441; H04L 47/2483; H04L 41/0896; H04L 41/0654; H04L 41/0895; H04L 49/354; H04L 49/70; H04L 47/24; H04L 45/24
See application file for complete search history.

(56) References Cited

U.S. PATENT DOCUMENTS

| | | | |
|---|---|---|---|
| 9,071,529 | B2 | 6/2015 | Garg et al. |
| 9,094,342 | B2 | 7/2015 | So et al. |
| 10,243,865 | B2 | 3/2019 | Izenberg et al. |
| 2011/0228781 | A1* | 9/2011 | Izenberg ................ H04L 47/33 370/392 |
| 2017/0289067 | A1* | 10/2017 | Lu ....................... H04L 41/0896 |
| 2020/0382537 | A1* | 12/2020 | Compton ............. H04L 43/028 |

OTHER PUBLICATIONS

"Dell Split Data Plane", Retrieved from: https://uh.edu/tech/netlab/research/dell-sdp/index, Retrieved Date: Mar. 2, 2021, 4 Pages.
"How to Configure and Activate a Virtual Router Instance with Hardware, Virtual, VLAN, or Bundled Interfaces", Retrieved from: https://web.archive.org/web/20200918113722/https:/campus.barracuda.com/product/cloudgenfirewall/doc/79462772/how-to-configure-and-activate-a-virtual-router-instance-with-hardware-virtual-vlan-or-bundled-interfaces/, Sep. 18, 2020, 8 Pages.
"SDA—Steps to configure Fusion Router", Retrieved from: https://www.cisco.com/c/en/us/support/docs/cloud-systems-management/dna-center/213525-sda-steps-to-configure-fusion-router.html. Retrieved Date: Mar. 8, 2020, 23 Pages.
"SONiC Programmability, Extensibility and Beyond", Retrieved from: https://www youtube.com/watch?v=TLi5n0cZbz0, Mar. 21, 2018, 4 Pages.
Fitzgerald, Drew, "Echoes of Y2K: Engineers Buzz That Internet is Outgrowing Its Gear", Retrieved from: https://www.wsj.com/articles/y2k-meets-512k-as-internet-limit-approaches-1407937617, Aug. 13, 2014, 4 Pages.
Huston, Geoff, "What's So Special about 512?", Retrieved from: https://web.archive.org/web/20170627063050/http://www.potaroo.net/ispcol/2014-09/512.pdf, Sep. 2014, pp. 1-18.
Rathore, et al., "PC-based Router Virtualization with Hardware Support", In Proceedings of IEEE 26th International Conference on Advanced Information Networking and Applications, Mar. 26, 2012, pp. 573-580.
"International Search Report and Written Opinion Issued in PCT Application No. PCT/US22/023181", dated Jun. 29, 2022, 11 Pages.
Unnikrishnan, et al., "Reconfigurable Data Planes for Scalable Network Virtualization", In Journal of IEEE Transactions on Computers, vol. 62, No. 1, Dec. 2013, pp. 2476-2488.

* cited by examiner

HARDWARE AND SOFTWARE ROUTER

CROSS-REFERENCE TO RELATED APPLICATION(S)

This non-provisional utility application claims priority to UK patent application number 2105736.9 entitled "HARDWARE AND SOFTWARE ROUTER" and filed on 22 Apr. 2021, which is incorporated herein in its entirety by reference.

BACKGROUND

Routers are widely used in communications networks of many types including telecommunications networks, intranets, extranets, the public internet and other networks, to receive and forward packets to appropriate next hop nodes in the communications network. Large scale routers, which deal with hundreds of thousands or routes and more, are expensive to manufacture and maintain.

When internet routing tables grew past 512 k routes in 2014, there were major problems whereby some internet service providers (ISPs) dropped some routes, or ceased processing updates, which meant gradually that odd bits of the internet ceased to work. Similar problems arise in other types of communications network where the number of routes is very large.

Some ISPs rely on filtering to reduce the routing table in size by aggregating routes together.

The internet routing table is predicted to soon grow past 1 million routes which could trigger the same problems as in 2014. There is a need for an internet router that can support millions of routes.

The embodiments described below are not limited to implementations which solve any or all disadvantages of known routers.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples there is a networking router with a processor and memory. The memory stores instructions that, when executed by the at least one processor, perform a method for forwarding network traffic comprising packets. The method comprises processing, by the hardware data plane, a first incoming packet by matching the packet with a routing table of the hardware data plane. The method involves processing, by the software data plane, a second incoming packet by matching the packet with a routing table of the software data plane. In response to the processing of the first incoming packet by the hardware data plane failing, subsequently processing, by the software data plane, the first incoming packet by matching the packet with the routing table of the software data plane. The method comprises delivering, from the software and hardware data plane, network traffic flow information to a flow analyzer. The flow analyzer analyzes the network traffic flow information and updates at least one of the routing tables based at least on the analyzed network traffic flow information.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

DETAILED DESCRIPTION

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples Although the present examples are described and illustrated herein as being implemented in an internet-scale networking router, the networking router described is provided as an example and not a limitation. As those skilled in the art will appreciate, the present examples are suitable for application in a variety of different types of routers including those used in intranets, telecommunications networks and other types of communications network besides the public internet.

A networking router is usually split into two parts: a control plane and a data plane. The primary function of a router is to forward a packet towards its destination network (destination IP address of the packet). The router does this by searching routing information stored in a routing table to find an address of a next-hop node to forward the packet to.

The routing table is analogous to a distribution map in package delivery. For example, when a first node desires to send data to another node on a network, it reads the destination address and if the first node cannot directly connect to the destination node, it sends the data along a route to the destination node. Routing tables are used by nodes to select next hop nodes for forwarding packets. A routing table is either configured in hardware or is implemented in software.

A routing table comprises destination address/next hop associations whereby these associations tell a router that a particular destination address can be reached by sending a packet to the specific router that represents the next hop on the way to the final destination. With hop-by-hop routing, each routing table lists the address of the next node along the path to that destination, i.e. the next hop.

When a router interface is configured with an IP address and subnet mask, the interface becomes a host on that attached network. In some examples, the network address and subnet mask of the interface, along with the interface type and number, are entered into the routing table as a directly connected network. The routing table typically comprises at least three information fields: a network identifier defining the destination subnet and netmask, a metric defining the routing metric of the path through which the packet is to be sent, and a next hop defining the address of the next station to which the packet is to be sent on the way to its final destination, as shown below in Table 1 (Table 1 is an exemplary routing table). Table 1 also includes the exemplary information field of an interface defining what locally available interface is responsible for reaching the gateway.

TABLE 1

| Network destination | Netmask | Gateway/next hop | Interface | Metric |
|---|---|---|---|---|
| 0.0.0.0 | 0.0.0.0 | 192.168.0.1 | 192.168.0.100 | 10 |
| 127.0.0.0 | 255.0.0.0 | 127.0.0.1 | 127.0.0.1 | 1 |
| 192.168.0.0 | 255.255.255.0 | 192.168.0.100 | 192.168.0.100 | 1 |
| 192.168.0.100 | 255.255.255.255 | 127.0.0.1 | 127.0.0.1 | 10 |
| 192.168.0.1 | 255.255.255.255 | 192.168.0.100 | 192.168.0.100 | 10 |

In some examples, routing tables are not used directly for packet forwarding, and are instead used to generate the information for a simpler forwarding table. The forwarding table comprises the routes which are chosen by a routing algorithm as preferred routes for packet forwarding. The routing table and/or forwarding table are usually, but not always, in a compressed or pre-compiled format that is optimized for hardware storage and lookup. The terms "routing table" and "forwarding table" are used interchangeably through this specification as the forwarding table is a type of routing table.

In various router architectures, it is arranged that the control plane function of the routing table and the data plane function of the routing table/forwarding table is separated.

The control plane part of a routing table is responsible for populating the routing table, understanding network topology and populating any forwarding tables. The control plane part of a routing table works out a plan for how packets are to be forwarded and programs the data plane to implement the plan. The control plane is implemented using software and typically runs routing protocols which exchange information with other routers to determine what forwarding information (or routes) to program into the data plane.

The data plane processes traffic that comes into the router by matching destination addresses of incoming packets to routes that have been programmed in the routing table. The data plane comprises functions and processes that forward packets/frames from one interface to another based on control plane logic. Routing table, forwarding table and the routing logic constitute the data plane function. A data plane of a router facilitates moving packets from source to destination. A data plane of a router is also often referred to as a forwarding plane.

As mentioned above, a routing table is a data table stored in a networking router or a location accessible to the networking router, that lists the routes to be used for particular network destinations and, in some cases, metrics associated with those routes.

Hardware based data plane routers have a fixed maximum number of routes that they can be programmed with. These routes are programmed into lookup tables. Newer, more programmable chips have flexibility as to how these tables are managed, but still have a hard maximum. Some new chips support a maximum of one million IPv4 routes with no IPv6 routes. This is currently enough for internet routing, but not for long.

The inventors have recognized that the fusion of a hardware-based and software-based router as part of a single networking router brings significant benefits. A hardware-based router is used to handle high throughput; however, a hardware-based router has limited route capacity as described above. The inventors have recognized that, at any one time, some of the routes handled by a hardware-based router are quiet and thus there is a benefit of enabling dynamic resource allocation between a hardware and software functions of a router. However, it is not straightforward to achieve dynamic resource allocation in a controllable manner which works well in practice.

A software-based router is able to handle an arbitrarily high number of routes where additional memory is available and is added on demand and at low cost.

Therefore, this invention combines a software-based data plane and a hardware-based data plane in the same router. In an example, traffic is initially processed by a hardware data plane of a forwarding engine, and if it fails to hit a routing match is passed to a software data plane of the forwarding engine.

Figure 1A:
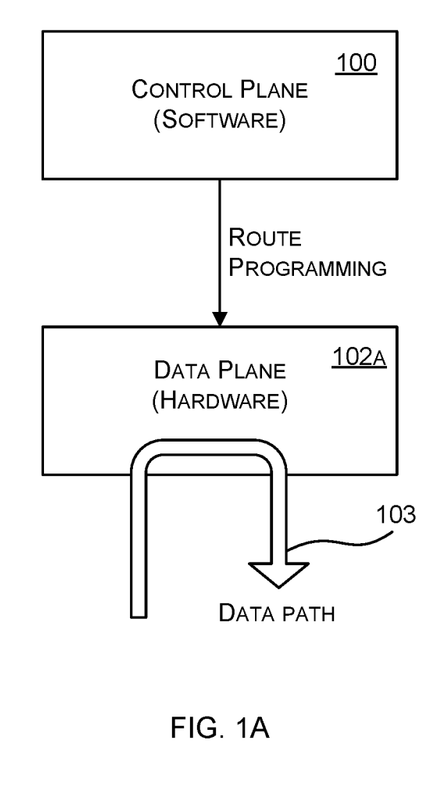
FIG. 1a is a networking router architecture showing an exemplary hardware router set-up.
Figure 1B:
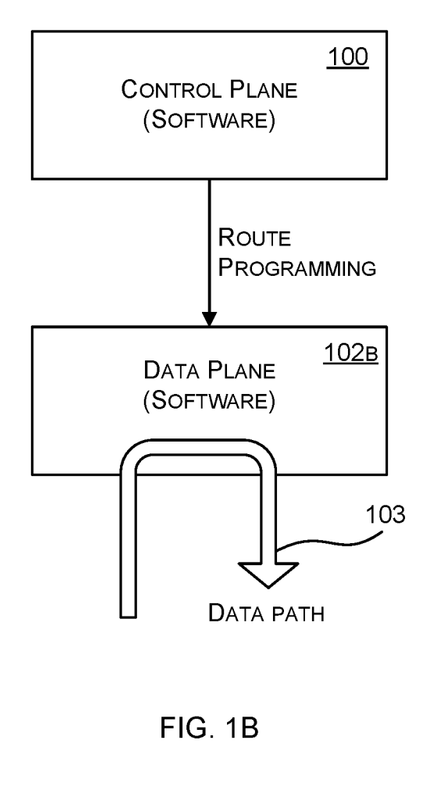
FIG. 1B is a networking router architecture showing an exemplary software router set-up.

FIGS. 1a and 1b are flow diagrams showing an exemplary software and/or hardware router deployment of a networking router.

In FIG. 1a, a control plane 100 is in the form of software and it programs routes into a hardware routing table in data plane 102a. An incoming packet is shown as part of a data path 103. If the destination address is in the routing table in the hardware data plane 102a the packet is routed successfully. If the destination address is not present in the routing table, because the hardware data plane has reached a memory limit, the packet is dropped or forwarded to an inappropriate next hop node.

FIG. 1B shows a software control plane used with a software data plane in a router. As shown in FIG. 1B, the hardware data plane 102a is replaced by a software data plane 102b with unlimited memory. Therefore, a software data plane can handle an unlimited number of routes. However, the drawback of a software data plane 102b alone in a networking router is the time taken to process the routes, particularly high traffic routes; that is, software routers have longer latency to route packets than hardware routers.

Figure 2:
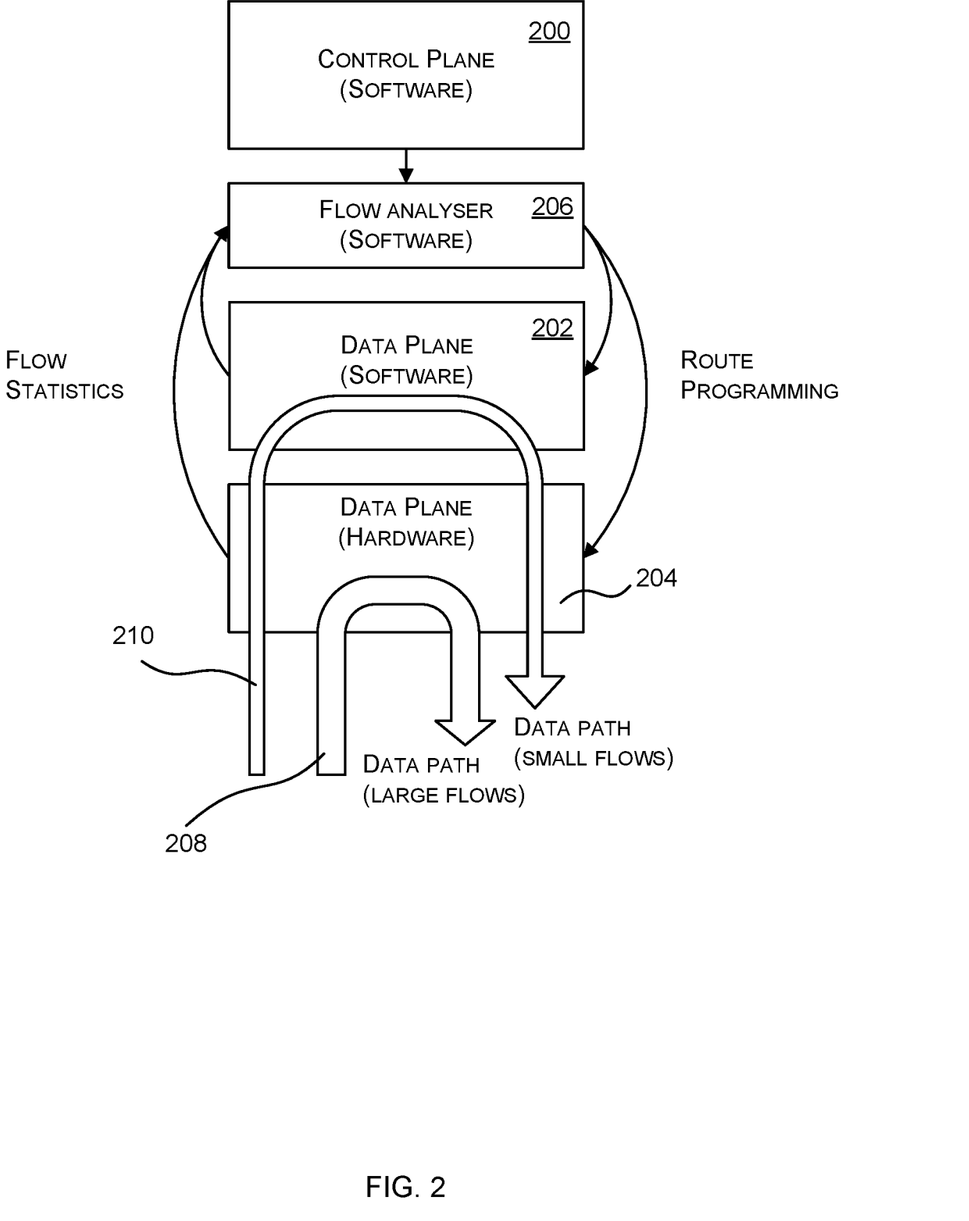
FIG. 2 is a networking router architecture showing an exemplary software and hardware router set-up.

FIG. 2 is a diagram showing the architecture of an exemplary networking router comprising a combined hardware and software router. In this diagram, two distinct data planes are formed; hardware data plane 204 and software data plane 202 as part of the same networking router. Each of the data planes 202, 204 comprise a routing table, wherein each routing table is identical or different (depending on the route programming providing by a flow analyzer—this is described in more detail below). The hardware and software data planes 102, 104, in various examples, process different packets in parallel.

In an example there is a routing table in the hardware data plane, which, for at least some destination addresses, specifies that an incoming packet with the destination address is to be processed by the software data plane rather than the hardware data plane. Both data planes are forwarding some traffic. Both data planes are programmed with the routing table in some examples. The software data plane has the full routing table programmed. The hardware data plane may not have enough space to be programmed with the full routing table, in which case the flow analyzer works out the appropriate subset to be programmed in the hardware data plane.

The networking router further comprises a flow analyzer 206 which is also in the form of software and is shown as being architecturally between a control plane 200 and the data planes 202, 204. The control plane is not responsible for forwarding traffic and is thus optional. In order for the fusion of a hardware and software router to operate more effectively, a flow analyzer 206 (or statistics analyzer) is employed. In various examples, the flow analyzer 206 is in communication with the control plane 200 (which is also a software element of the networking router), and it is also in two-way communication with each of the software and hardware data planes 202, 204. Flow statistics comprising traffic flow information are communicated from the hardware and software data planes 202, 204 to the flow analyzer, and, based on the flow traffic information, the flow analyzer is able to communicate updated routes to the hardware and/or software data planes, specifically updating the routing tables of at least one of the hardware or software data plane(s).

More specifically, the flow analyzer is employed to ensure that high rate flows are matched by the hardware data plane where possible, and that routes are programmed in the software data plane. Therefore, in some examples, both the software and hardware data planes stream statistics about the traffic flow information to the flow analyzer, and the flow analyzer communicates updates of routes to the hardware data plane. This allows an internet scale networking router to be created with a lower hardware capacity as compared with a hardware only internet scale networking router. Thus the overall cost of the router is reduced. The hardware will no longer "overflow" which stops routing errors. Some hardware drops offline when it overflows causing downtime and so this type of downtime is ameliorated. Specifically, it is the flow analyzer that operates in an unconventional manner in combination with the hardware and software data planes to achieve the technical effect of providing a low maintenance networking router that can handle more routes than a conventional router. The combination of a hardware and software data plane in a single networking router also results in reduced latency as the software can be arranged to handle only certain routes (e.g. low traffic routes).

The interaction between the flow analyzer and the hardware/software data planes improves the underlying networking router by streamlining the hardware necessary to handle high traffic routes, and allowing software to handle both the remaining routes and the high traffic routes when the hardware data plane has reached its processing load limit.

Figure 3:
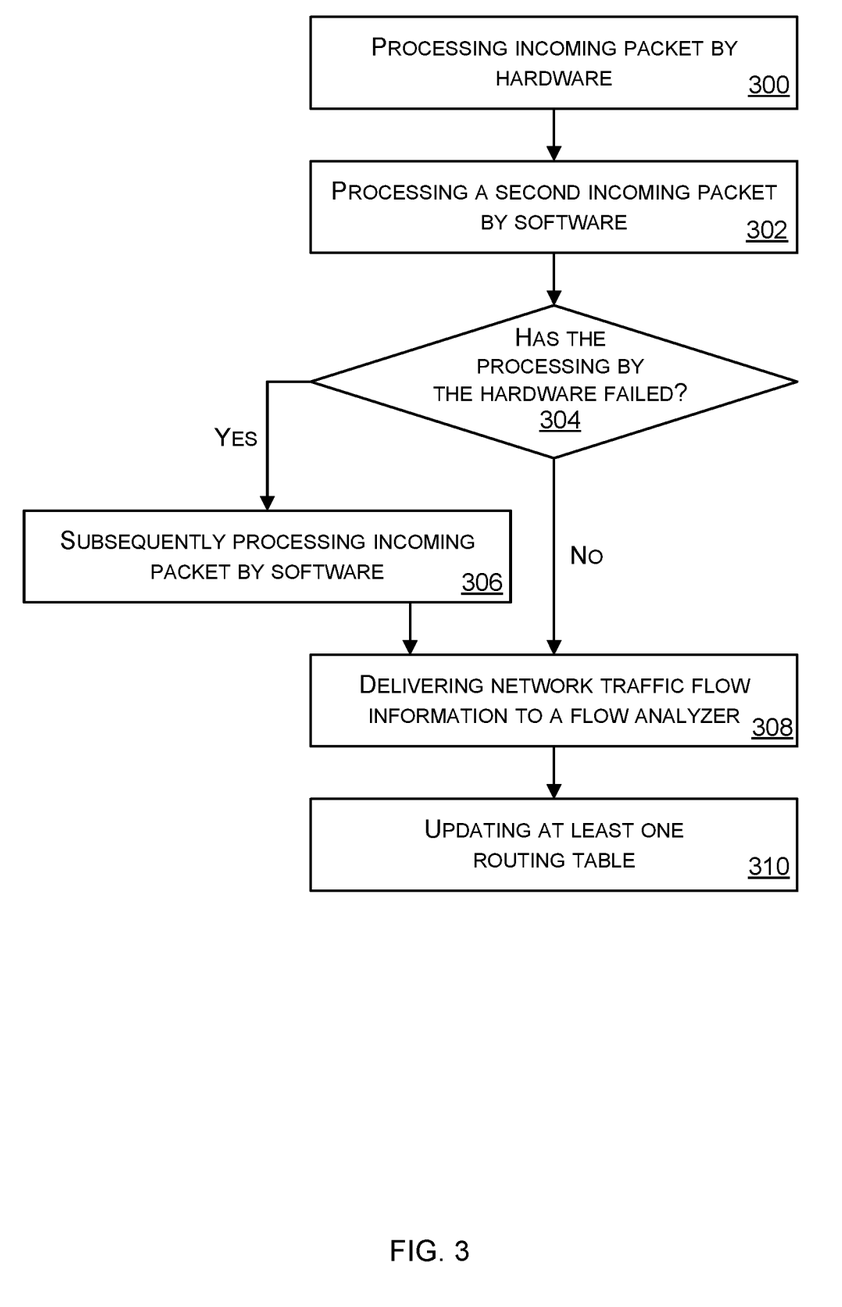
FIG. 3 is a flow diagram of a method for forwarding traffic in a networking router with hardware and software data planes.

FIG. 3 is a flow diagram showing an exemplary method performed by a networking router such as that of FIG. 2. Prior to the method of FIG. 3. Routing tables are programmed in the networking router. The routing tables comprise one or more routing or forwarding tables in the hardware data plane 204 and one or more routing or forwarding tables in the software data plane 202. In an example the software data plane 204 has a routing table with entries for the destination addresses covered in the hardware data plane routing table. The hardware data plane routing table has entries specifying destination addresses or ranges of destination addresses to be processed by the software data plane and not the hardware data plane. The hardware data plane routing table has entries for routing a subset of the routes of the software data plane.

In operation 100, an incoming packet received at the networking router is processed by the hardware data plane by matching the packet with a routing table of the hardware data plane (as shown in FIG. 2 by arrow 208). Either in parallel, or separately, a second incoming packet is processed 302 by the software data plane by matching the second incoming packet with the routing table of the software data plane. Note that the second incoming packet travels via the hardware data plane to the software data plane. The second incoming packet is identified by the hardware data plane as one to be forwarded to the software data plane.

In the event that the hardware data plane fails to process (operation 304) a packet (because, for example, there is no suitable entry in the routing table corresponding to a destination address of the packet since a memory limit of the hardware data plane limited the coverage of destination addresses, or because the hardware data plane has information indicating to not process the packet), the method continues to operation 306 whereby the packet (which has failed to be processed by the hardware data plane) is forwarded to the software data plane. The packet is subsequently processed by the software data plane by matching the packet with the routing table of the software data plane. In an example, the software routing table comprises at least all routes that are present in the hardware routing table. Therefore, the software data plane is able to handle any routes that can be handled by the hardware data plane, but may also handle further routes that bypass the hardware data plane altogether (as shown in FIG. 2 by the data path 210). In various options of the present invention, the hardware data plane fails if a hardware data plane memory limit is met. Alternatively, the processing by the hardware data plane fails if the routing table of the hardware routing table specifies that an incoming packet is to be processed by the software data plane. In some examples, the hardware and the software routing table is the same routing table and with the hardware routing table modified to indicate destination addresses of packets to be forwarded to the software data plane.

Regardless of whether the hardware or the software processes the first incoming packet, each of the hardware and software data planes communicate (operation 308) with a flow analyzer, specifically communicating network traffic flow information to the flow analyzer.

The flow analyzer communicates with at least one of the hardware and software data planes by updating (operation 310) their routing table based on the received network traffic flow information.

The updating of the at least one routing table comprises dynamically configuring processing loads by the hardware and software data planes based on, for example, the traffic flow of certain routes. For example, as the hardware data plane is able to process a route with reduced latency compared to the software data plane, the flow analyzer updates the at least one routing table by directing high traffic routes to the hardware and low traffic routes to the software. This has the technical effect that packets of high traffic routes are processed with reduced latency.

In another example, the networking router is configured such that routes with an above-average network traffic flow, as determined by analyzing the network traffic flow information, are processed by the hardware data plane. For any of the above examples, the networking router is arranged to analyze the network traffic flow information using machine learning techniques (and subsequently update the routing table(s) based on this) so as to streamline the networking router, i.e. the high traffic flow is directed to the hardware data plane while the low traffic flow packets are handled by the software data plane.

Figure 4:
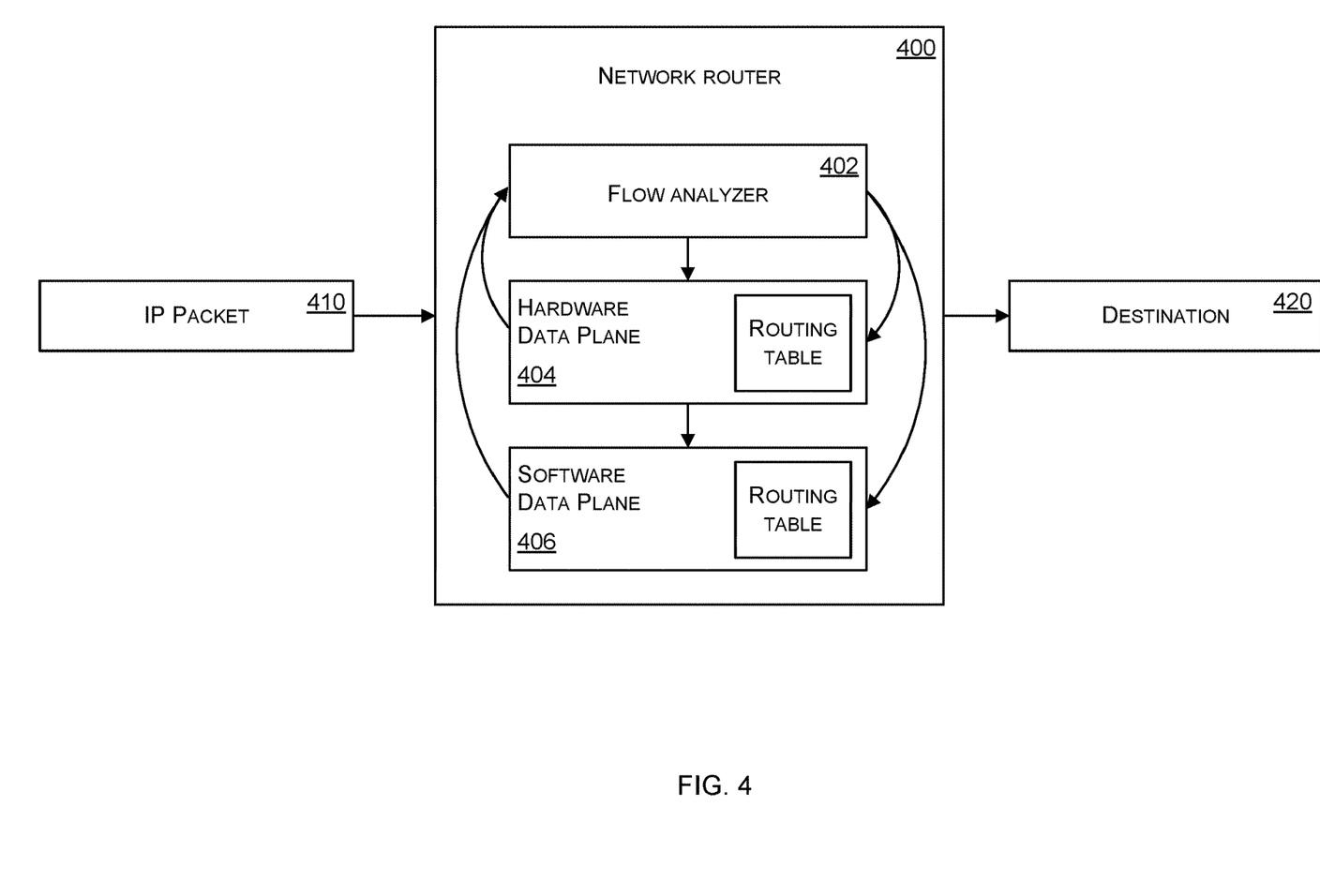
FIG. 4 is a schematic diagram of a network router.

FIG. 4 illustrates the networking router 400 in operation such that an incoming packet 410 is processed by the networking router 400 comprising a flow analyzer 402, hardware data plane 404 and a software data plane 406, and then being forwarded to its destination 420. As illustrated in FIG. 4 both the hardware data plane 404 and software data plane 406 have at least one routing table which is the same routing table in some examples.

Figure 5:
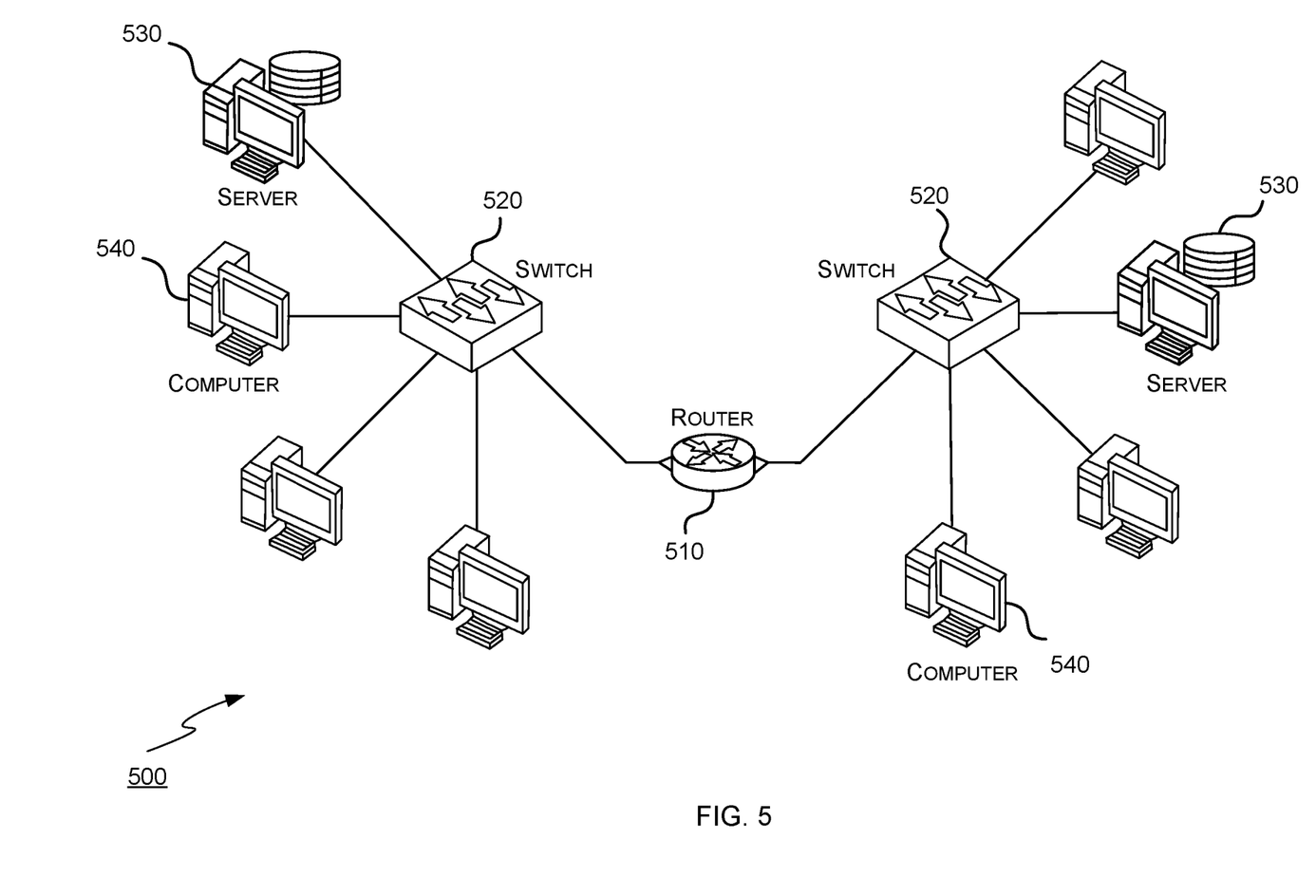
FIG. 5 illustrates an exemplary communications network in which a networking router is deployed.

FIG. 5 illustrates a communication network 500 comprising a networking router 510 such as the networking router described with reference to FIG. 2 and FIG. 4, at least one switch 520 and computing devices 530, 540 (e.g. computers and servers). The networking router 510 receives packets from a computing device via a switch, and then forwards the packet to the destination computing device, as described in detail in the various examples of the networking router above.

The networking router 510 comprises one or more processors which are microprocessors, controllers or any other suitable type of processors for processing computer executable instructions to control the operation of the networking router in order to create a fusion of a hardware and software data plane.

The computer executable instructions are provided using any computer-readable media that is accessible by networking router. Computer-readable media includes, for example, computer storage media such as memory and communications media. Computer storage media, such as memory, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory) is shown within the computing-based device it will be appreciated that the storage is, in some examples, distributed or located remotely and accessed via a network or other communication link (e.g. using communication interface).

Alternatively or in addition to the other examples described herein, examples include any combination of the following:

Clause A: A networking router comprising:
at least one processor;
a memory storing instructions that, when executed by the at least one processor, perform a method for forwarding network traffic comprising packets, comprising:
processing, by the hardware data plane, a first incoming packet by matching the packet with a routing table of the hardware data plane;
processing, by the software data plane, a second incoming packet by matching the packet with a routing table of the software data plane;
in response to the processing of the first incoming packet by the hardware data plane failing, subsequently processing, by the software data plane, the first incoming packet by matching the packet with the routing table of the software data plane;
delivering, from the software and hardware data plane, network traffic flow information to a flow analyzer;
analyzing, by the flow analyzer, the network traffic flow information; and
updating, by the flow analyzer, at least one of the routing tables based at least on the analyzed network traffic flow information.

Clause B: The networking router of clause A, wherein the processing by the hardware data plane fails if a hardware data plane memory limit is met.

Clause C: The networking router of clause A, wherein the processing by the hardware data plane fails in response to the routing table of the hardware data plane specifying that an incoming packet is to be processed by the software data plane.

Clause D: The networking router of any preceding clause, wherein updating the at least one routing table comprises dynamically configuring processing loads by the hardware and software data planes.

Clause E: The networking router of any preceding clause, wherein routes with an above-average network traffic flow, as determined by analyzing the network traffic flow information, are processed by the hardware data plane.

Clause F: The networking router of any preceding clause, wherein analyzing the network traffic flow information comprises analyzing the network traffic flow information based at least on machine learning techniques.

Clause G: The networking router of any preceding clause, wherein the routing table of the hardware data plane is a subset of the routing table of the software data plane.

Clause H: The networking router of any preceding clause, wherein the flow analyzer is configured to compute statistics about the average flow rate and to update information in the routing table of the hardware data plane about which packets to forward to the software data plane using the computed statistics.

Clause I: The networking router of any preceding clause, wherein the flow analyzer is configured to compute statistics relating to a rate of increase in traffic flow of routes and to update information in the routing table of the hardware data plane about which packets to forward to the software data plane using the computed statistics.

Clause J: A method for forwarding network traffic, comprising:
processing, by the hardware data plane, a first incoming packet by matching the packet with a routing table of the hardware data plane;

processing, by the software data plane, a second incoming packet by matching the packet with a routing table of the software data plane;

in response to the processing of the first incoming packet by the hardware data plane failing, subsequently processing, by the software data plane, the first incoming packet by matching the packet with the routing table of the software data plane;

delivering, from the software and hardware data plane, network traffic flow information to a flow analyzer;

analyzing, by the flow analyzer, the network traffic flow information; and updating, by the flow analyzer, at least one of the routing tables based at least on the analyzed network traffic flow information.

Clause K: The method of clause J, wherein the processing by the hardware data plane fails if a hardware data plane memory limit is met.

Clause L: The method of clause J, wherein the processing by the hardware data plane fails if the routing table of the hardware data plane specifies that an incoming packet is to be processed by the software data plane.

Clause M: The method of any of clauses clause J to L, wherein updating the routing table comprises dynamically configuring processing loads by the hardware and software data planes.

Clause N: The method of any of clauses clause J to M, wherein analyzing the network traffic flow information comprises analyzing the network traffic flow information based at least on machine learning techniques.

Clause O: One or more device-readable media with device-executable instructions that, when executed by a computing system, direct the computing system to perform operations comprising:

processing, by the hardware data plane, a first incoming packet by matching the packet with a routing table of the hardware data plane;

processing, by the software data plane, a second incoming packet by matching the packet with a routing table of the software data plane;

in response to the processing of the first incoming packet by the hardware data plane failing, subsequently processing, by the software data plane, the first incoming packet by matching the packet with the routing table of the software data plane;

delivering, from the software and hardware data plane, network traffic flow information to a flow analyzer;

analyzing, by the flow analyzer, the network traffic flow information; and updating, by the flow analyzer, at least one of the routing tables based at least on the analyzed network traffic flow information such that only routes with a network traffic flow above a threshold, as determined by analyzing the network traffic flow information, are assigned to be initially processed by the hardware data plane.

Clause P: The one or more device-readable media of clause O, wherein the threshold is determined by optimizing the processing loads of the hardware and software data planes.

Clause Q: The one or more device-readable media of clause O or clause P, wherein the processing by the hardware data plane fails if a hardware data plane memory limit is met.

Clause R: The one or more device-readable media of clause O or clause P, wherein the processing by the hardware data plane fails if the routing table of the hardware data plane specifies that an incoming packet is to be processed by the software data plane.

Clause S: The one or more device-readable media of any of clauses O to R, wherein routes with an above-average network traffic flow, as determined by analyzing the network traffic flow information, are processed by the hardware data plane.

Clause T: A communication network comprising:
a network router as defined in clause A;
at least one network switch;
two or more computing-based devices.

Clause U: A networking router comprising: at least one processor and a memory storing instructions that, when executed by the at least one processor, implement a software data plane and a flow analyzer; and circuitry configured to implement a hardware data plane; the networking router configured to: process, by the hardware data plane, a first incoming packet by matching the packet with a routing table of the hardware data plane; process, by the software data plane, a second incoming packet by matching the packet with a routing table of the software data plane; in response a failure to process the first incoming packet by the hardware data plane, process, by the software data plane, the first incoming packet by matching the packet with the routing table of the software data plane; deliver, by the software and hardware data plane, network traffic information to the flow analyzer; analyze, by the flow analyzer, the network traffic flow information; and update, by the flow analyzer, at least one of the routing tables based at least on the analyzed network traffic flow information.

Clause V: A method for forwarding network traffic by a networking router comprising a hardware data plane, a software data plane, and a flow analyzer, the method comprising: processing, by the hardware data plane, a first incoming packet by matching the packet with a routing table of the hardware data plane; processing, by the software data plane, a second incoming packet by matching the packet with a routing table of the software data plane; in response to a failure to process the first incoming packet by the hardware data plane, processing, by the software data plane, the first incoming packet by matching the packet with the routing table of the software data plane; delivering, from the software and hardware data plane, network traffic flow information to the flow analyzer; analyzing, by the flow analyzer, the network traffic flow information; and updating, by the flow analyzer, at least one of the routing tables based at least on the analyzed network traffic flow information.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'subset' is used herein to refer to a proper subset such that a subset of a set does not comprise all the elements of the set (i.e. at least one of the elements of the set is missing from the subset).

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. A networking router comprising:
   at least one processor and a memory storing instructions that, when executed by the at least one processor, implement a software data plane and a flow analyzer; and
   circuitry configured to implement a hardware data plane;
   the networking router configured to:
      process, by the hardware data plane of the networking router, a first incoming packet by routing the first incoming packet with a routing table of the hardware data plane;
      process, by the software data plane of the networking router, a second incoming packet by routing the second incoming packet with a routing table of the software data plane, wherein the second incoming packet is processed while the first incoming packet is being processed;
      determine that the processing of the first incoming packet by the hardware data plane of the networking router has failed;
      in response to determining that the processing of the first incoming packet by the hardware data plane has failed, process, by the software data plane of the networking router, the first incoming packet by routing the first incoming packet with the routing table of the software data plane;
      deliver, from the software data plane and the hardware data plane, network traffic flow information to a flow analyzer of the networking router;
      analyze, by the flow analyzer of the networking router, the network traffic flow information;
      update, by the flow analyzer of the networking router, at least one of the routing table of the hardware data plane and the routing table of the software data plane based at least on the analyzed network traffic flow information such that only routes with a network traffic flow above a threshold, as determined by analyzing the network traffic flow information, are assigned to be initially processed by the hardware data plane; and
      dynamically configuring processing loads by the hardware and software data planes;
      wherein the threshold is determined by optimizing the processing loads of the hardware and software data planes.

2. The networking router of claim 1, wherein the processing by the hardware data plane fails if a hardware data plane memory limit is met.

3. The networking router of claim 1, wherein the processing by the hardware data plane fails in response to the routing table of the hardware data plane specifying that an incoming packet is to be processed by the software data plane.

4. The networking router of claim 1, wherein routes with an above-average network traffic flow, as determined by analyzing the network traffic flow information, are processed by the hardware data plane.

5. The networking router of claim 1, wherein analyzing the network traffic flow information comprises analyzing the network traffic flow information based at least on machine learning techniques.

6. The networking router of claim 1, wherein the routing table of the hardware data plane is a subset of the routing table of the software data plane.

7. The networking router of claim 1, wherein the flow analyzer is configured to compute statistics about an average flow rate and to update information in the routing table of the hardware data plane about which packets to forward to the software data plane using the computed statistics.

8. The networking router of claim 1, wherein the flow analyzer is configured to compute statistics relating to a rate of increase in traffic flow of routes and to update information in the routing table of the hardware data plane about which packets to forward to the software data plane using the computed statistics.

9. A method for forwarding network traffic by a network router comprising a hardware data plane, a software data plane, and a flow analyzer, the method comprising:
   processing, by the hardware data plane of the networking router, a first incoming packet by routing the first incoming packet with a routing table of the hardware data plane;
   processing, by the software data plane of the networking router, a second incoming packet by routing the second incoming packet with a routing table of the software data plane, wherein the second incoming packet is processed while the first incoming packet is being processed;
   determining that the processing of the first incoming packet by the hardware data plane of the networking router has failed;

in response to determining that the processing of the first incoming packet by the hardware data plane has failed, subsequently processing, by the software data plane of the networking router, the first incoming packet by routing the first incoming packet with the routing table of the software data plane;

delivering, from the software data plane and the hardware data plane, network traffic flow information to a flow analyzer of the networking router;

analyzing, by the flow analyzer of the networking router, the network traffic flow information;

updating, by the flow analyzer of the networking router, at least one of the routing table of the hardware data plane and the routing table of the software data plane based at least on the analyzed network traffic flow information; and dynamically configure processing loads by the hardware and software data planes.

10. The method of claim 9, wherein the processing by the hardware data plane fails if a hardware data plane memory limit is met.

11. The method of claim 9, wherein the processing by the hardware data plane fails if the routing table of the hardware data plane specifies that an incoming packet is to be processed by the software data plane.

12. The method of claim 9, wherein analyzing the network traffic flow information comprises analyzing the network traffic flow information based at least on machine learning techniques.

13. A communication network comprising:
at least one network router;
at least one network switch;
two or more computing-based devices; wherein the at least one network router comprises:
at least one processor;
a memory storing instructions that, when executed by the at least one processor, implement a software data plane and a flow analyzer; and
circuitry configured to implement a hardware data plane;
the networking router configured to perform operations comprising:
processing, by the hardware data plane of the networking router, a first incoming packet by routing the first incoming packet with a routing table of the hardware data plane;

processing, by the software data plane of the networking router, a second incoming packet by routing the second incoming packet with a routing table of the software data plane, wherein the second incoming packet is processed while the first incoming packet is being processed;

determining that the processing of the first incoming packet by the hardware data plane of the networking router has failed;

in response to determining that the processing of the first incoming packet by the hardware data plane has failed, subsequently processing, by the software data plane of the networking router, the first incoming packet by routing the first incoming packet with the routing table of the software data plane;

delivering, from the software data plane and the hardware data plane, network traffic flow information to a flow analyzer of the networking router;

analyzing, by the flow analyzer of the networking router, the network traffic flow information;

updating, by the flow analyzer of the networking router, at least one of the routing table of the hardware data plane and the routing table of the software data plane based at least on the analyzed network traffic flow information such that only routes with a network traffic flow above a threshold, as determined by analyzing the network traffic flow information, are assigned to be initially processed by the hardware data plane; and dynamically configuring processing loads by the hardware and software data planes;

wherein the threshold is determined by optimizing the processing loads of the hardware and software data planes.

14. The communication network of claim 13, wherein the processing by the hardware data plane fails if a hardware data plane memory limit is met.

15. The communication network of claim 13, wherein the processing by the hardware data plane fails if the routing table of the hardware data plane specifies that an incoming packet is to be processed by the software data plane.

16. The communication network of claim 13, wherein routes with an above-average network traffic flow, as determined by analyzing the network traffic flow information, are processed by the hardware data plane.

\* \* \* \* \*